US007856696B2

(12) United States Patent
Huck

(10) Patent No.: US 7,856,696 B2
(45) Date of Patent: Dec. 28, 2010

(54) MOVEABLE BOOM HINGE

(75) Inventor: Kenneth Huck, Windom, MN (US)

(73) Assignee: AGCO Corporation, Duluth, GA (US)

( * ) Notice: Subject to any disclaimer, the term of this patent is extended or adjusted under 35 U.S.C. 154(b) by 49 days.

(21) Appl. No.: 12/332,684

(22) Filed: Dec. 11, 2008

(65) Prior Publication Data
US 2010/0146735 A1 Jun. 17, 2010

(51) Int. Cl.
*E05D 3/06* (2006.01)
(52) U.S. Cl. ...................................................... 16/366
(58) Field of Classification Search ................. 16/366, 16/266, 267, 371, 334, 326; 135/29, 31, 135/30, 120.1, 120.3, 151, 144, 145, 146, 135/154, 20.1, 909; 403/150, 157, 159; 24/31 H, 24/339; 248/284.1, 276.1, 282.1
See application file for complete search history.

(56) References Cited

U.S. PATENT DOCUMENTS

| | | | | |
|---|---|---|---|---|
| 592,718 | A * | 10/1897 | Thompson et al. | 278/58 |
| 2,885,695 | A * | 5/1959 | Feezel et al. | 5/659 |
| 3,662,694 | A * | 5/1972 | Mitchell | 108/131 |
| 4,125,273 | A * | 11/1978 | Rothmayer | 280/603 |
| 4,372,492 | A | 2/1983 | Blumenshine | |
| 4,534,079 | A * | 8/1985 | Tucker | 14/14 |
| 4,641,395 | A | 2/1987 | Banks | |
| 4,928,350 | A * | 5/1990 | Morgan | 16/297 |
| 6,027,039 | A | 2/2000 | Mercil | |
| 6,901,937 | B2 * | 6/2005 | Sebban | 132/301 |
| 7,254,869 | B2 * | 8/2007 | You | 16/326 |
| 2003/0234509 | A1 * | 12/2003 | Chen et al. | 280/278 |
| 2006/0087095 | A1 * | 4/2006 | Huang | 280/278 |
| 2008/0172838 | A1 * | 7/2008 | Choi | 16/366 |

* cited by examiner

*Primary Examiner*—Robert J Sandy
*Assistant Examiner*—Matthew Sullivan

(57) ABSTRACT

A moveable boom hinge apparatus is provided. The moveable boom hinge apparatus provides a mechanism offsetting the tip portion of a boom hinge from the base portion of a boom hinge when the tip and base portions are folded parallel to each other and securely position the tip portion of the boom when extended. Additionally, this moveable boom hinge apparatus provides a uniquely u-shaped link element and complementary u-shaped catch element that couple together in a way that sufficiently locks the tip portion into place with respect to the base portion and keeps structural loads of a boom hinge aligned with structural members of a boom hinge during its boom hinge's transition from the operational position to the non-operational position. This alignment significantly reduces bending moments that weaken structural materials over time. Therefore, this moveable boom hinge apparatus can be made with lighter, less-costly materials as opposed to the heavy, more costly materials that are currently used for boom hinge devices.

17 Claims, 6 Drawing Sheets

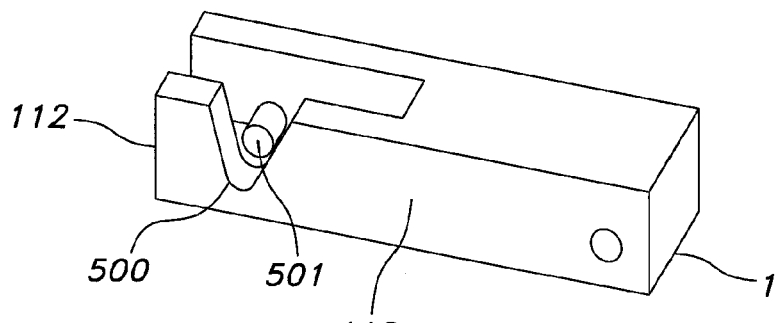
FIG. 5A
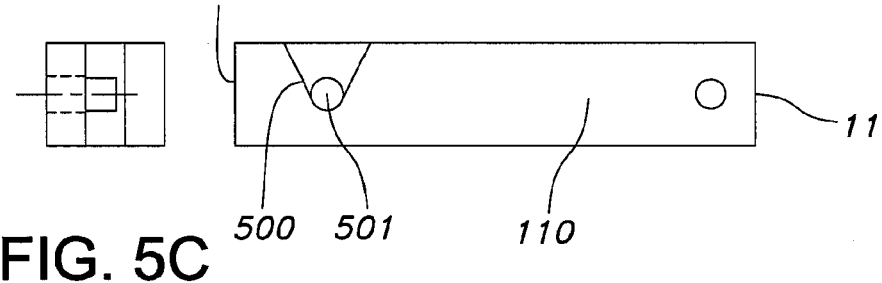
FIG. 5B
FIG. 5C
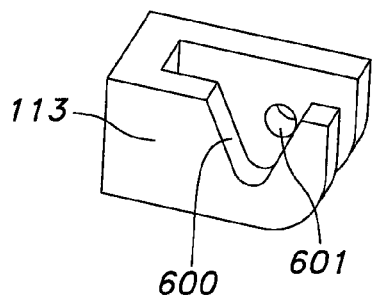
FIG. 6A
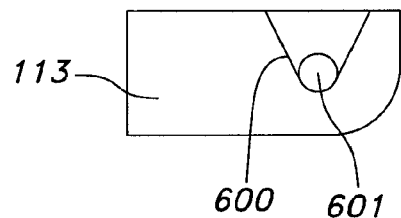 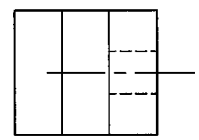
FIG. 6B  FIG. 6C

MOVEABLE BOOM HINGE

TECHNICAL FIELD

The present invention relates generally to the field of agricultural vehicles, and more particularly, to a boom hinge device for use with an agricultural vehicle.

BACKGROUND

When agricultural chemicals, such as fertilizers, herbicides, and pesticides are sprayed over an area, it is desirable to broadcast such chemicals over as large an area as possible during a single pass across a field. This minimizes the amount of time and energy expended and also minimizes the impact on the environment caused by the treading of the transportation equipment. The agricultural equipment most commonly used for spraying agricultural chemicals are booms. Most booms are attached to a tractor or placed in the rear of a pickup truck; some are even self-propelled. Because it is desirable to broadcast chemicals over as large an area as possible, boom lengths are generally relatively long, with most booms averaging between 60 and 90 feet in length. This long length poses many difficulties. First, the length of booms makes it difficult to move the boom from one location to another. Second, the length makes it difficult to maintain the necessary rigidity for proper spray patterns. Third, the length makes it difficult to design a boom that is able to avoid ground obstructions, with its spray nozzles and plumbing equipment. Thus, as booms travel over uneven and rough terrain, the boom is damaged from constant bouncing and jolting over ground obstructions. This bouncing and jolting often causes boom hinges and bearings to crack and structural members of the boom to bend.

A boom hinge is a specific boom design that uses a hinge device to connect the pieces comprising the boom, allowing only a limited angle of rotation between them. This angle of rotation allows the pieces of a boom hinge to fold, which in turn shortens the length of the boom hinge. Most boom hinge designs successfully carry out the function of folding; however there are a few problems with the prior art. In some boom designs, the actual folding introduces bending moments into the structures thereby requiring the structural members to be made with stronger and more costly materials. Other boom hinge designs lock the pieces that comprise the boom too tight, also causing the boom members to bend. Accordingly, there is a need in the art for an improved boom hinge design that carries out the folding and locking functions in a way that minimizes the bending of the structures. Such a design is beneficial because it will enable the boom to be made with lighter and less-costly materials.

BRIEF SUMMARY OF THE INVENTION

It is a primary objective of the present invention to provide a moveable boom hinge apparatus that provides a novel and effective way for offsetting the tip portion of the boom hinge from the base portion of the boom hinge when the tip and base portions are folded parallel to each other in the non-operational position. This offsetting means will in turn minimize the bending moments typically introduced into the structural members of a boom hinge and allow the boom hinge to be made of lighter and less-costly materials. Furthermore, this boom hinge apparatus allows for the tip portion to easily "breakaway" from the base portion and move to a folded position when the boom hinge comes into contact with ground obstructions of certain force.

The boom apparatus of the present invention has a link element that connects the tip portion to the base portion of the boom hinge, which provides an offset between the tip portion and the base portion when they are folded parallel to each other in the non-operational position. The link element is rotatably connected to a point on the base portion and connected to the tip portion by way of a catch element located on the tip portion. The catch element can include a unique u-shaped cutout that couples to a complementary u-shaped cutout and pin on the link element. The catch element and the link element are coupled such that they can rotate with respect to each other.

As the tip portion unfolds to the operational position, the catch element and link element engage a pin located on the base. As the tip portion continues to unfold, the catch element continues to rotate around the base pin. This particular motion captures and surrounds the pin on the base and locks the tip portion into position with respect to the base portion and allows for the transfer of forces from the tip portion to the base portion. The orientation of the catch element keeps the base pin captured for approximately 90 degrees or more of tip rotation with respect to the base. This angle of rotation is more than adequate for the tip portion to "breakaway" from the base portion upon contact with a ground obstruction and fold back into the non-operational position.

The link and catch elements, in an exemplary embodiment of the present invention, are oriented to keep the structural loads aligned with the structural members during transition from the operational position to the non-operational position. This alignment significantly reduces bending moments that weaken the structural materials over time. Therefore, the present invention can be made with lighter, less-costly materials as opposed to the heavy, more costly materials that are currently being used for boom hinge devices. However, traditional materials are still suitable for use in the present invention if desired.

These and other features as well as advantages which characterize the various preferred embodiments of present invention will be apparent from a reading of the following detailed description and a review of the associated drawings.

BRIEF DESCRIPTION OF THE DRAWINGS

FIGS. 5A-C are illustrations of a u-shaped cutout and pin on the link element in accordance with an exemplary embodiment of the present invention.

FIGS. 6A-C are illustrations of a u-shaped cutout and a circular opening on the catch element in accordance with an exemplary embodiment of the present invention.

DETAILED DESCRIPTION OF PREFERRED EMBODIMENTS

Figure 1:
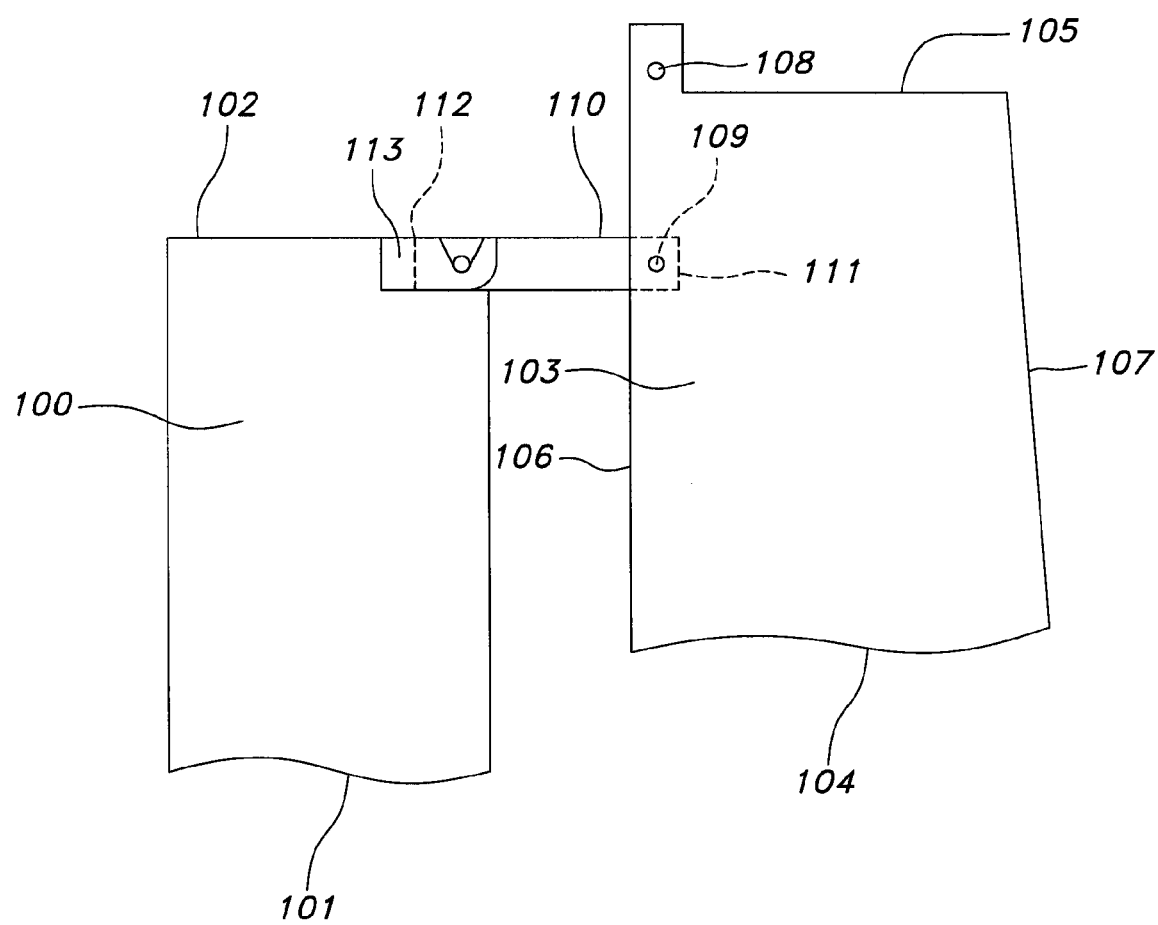
FIG. 1 is an illustration of an exemplary embodiment of the present invention in a folded, non-operational position.

Referring now to the drawings, in which like numerals represent like elements, exemplary embodiments of the present invention are herein described.

Figure 2:
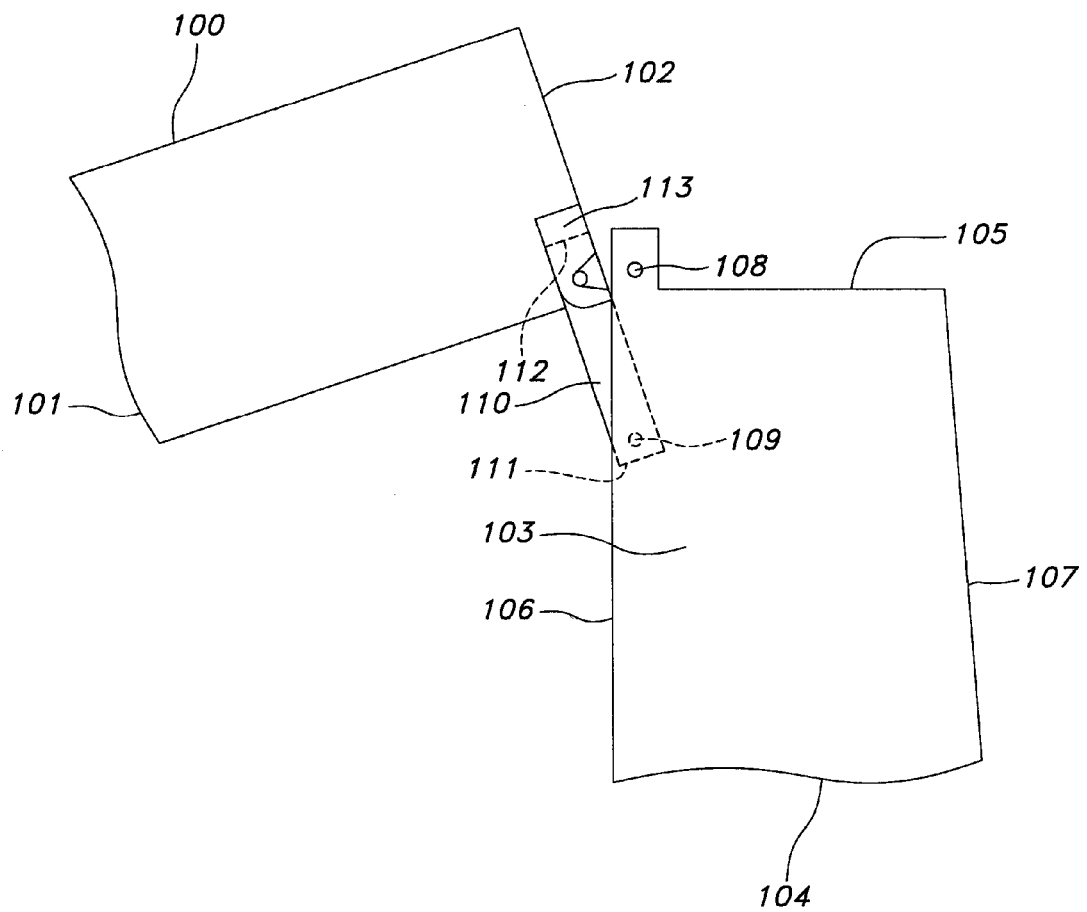
FIG. 2 is an illustration of an exemplary embodiment of the present invention in a partially extended position, wherein the boom hinge is nearly halfway to an extended position.
Figure 3:
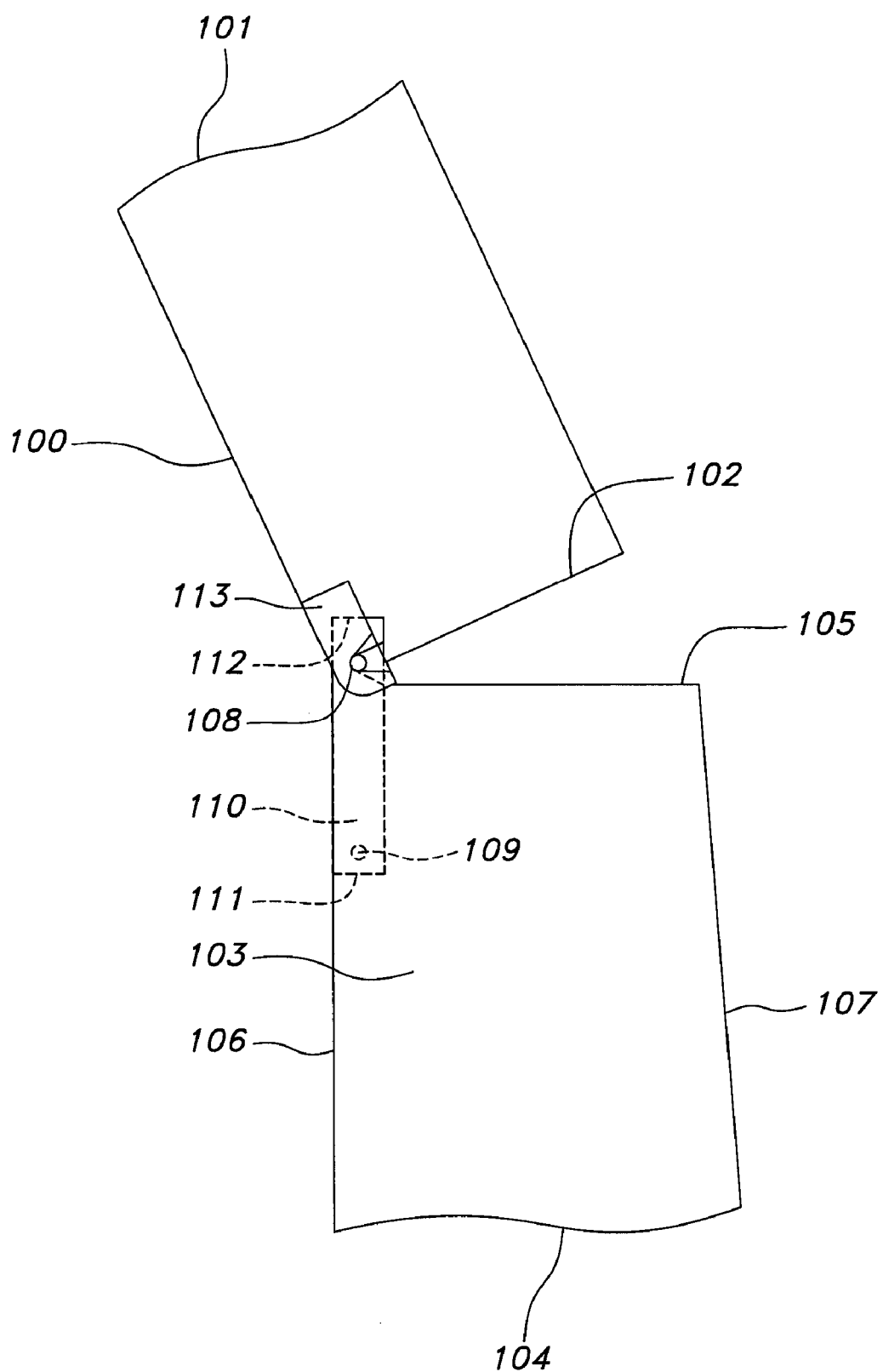
FIG. 3 is an illustration of an exemplary embodiment of the present invention in a partially extended position, wherein the boom hinge is almost in a fully extended position.
Figure 4:
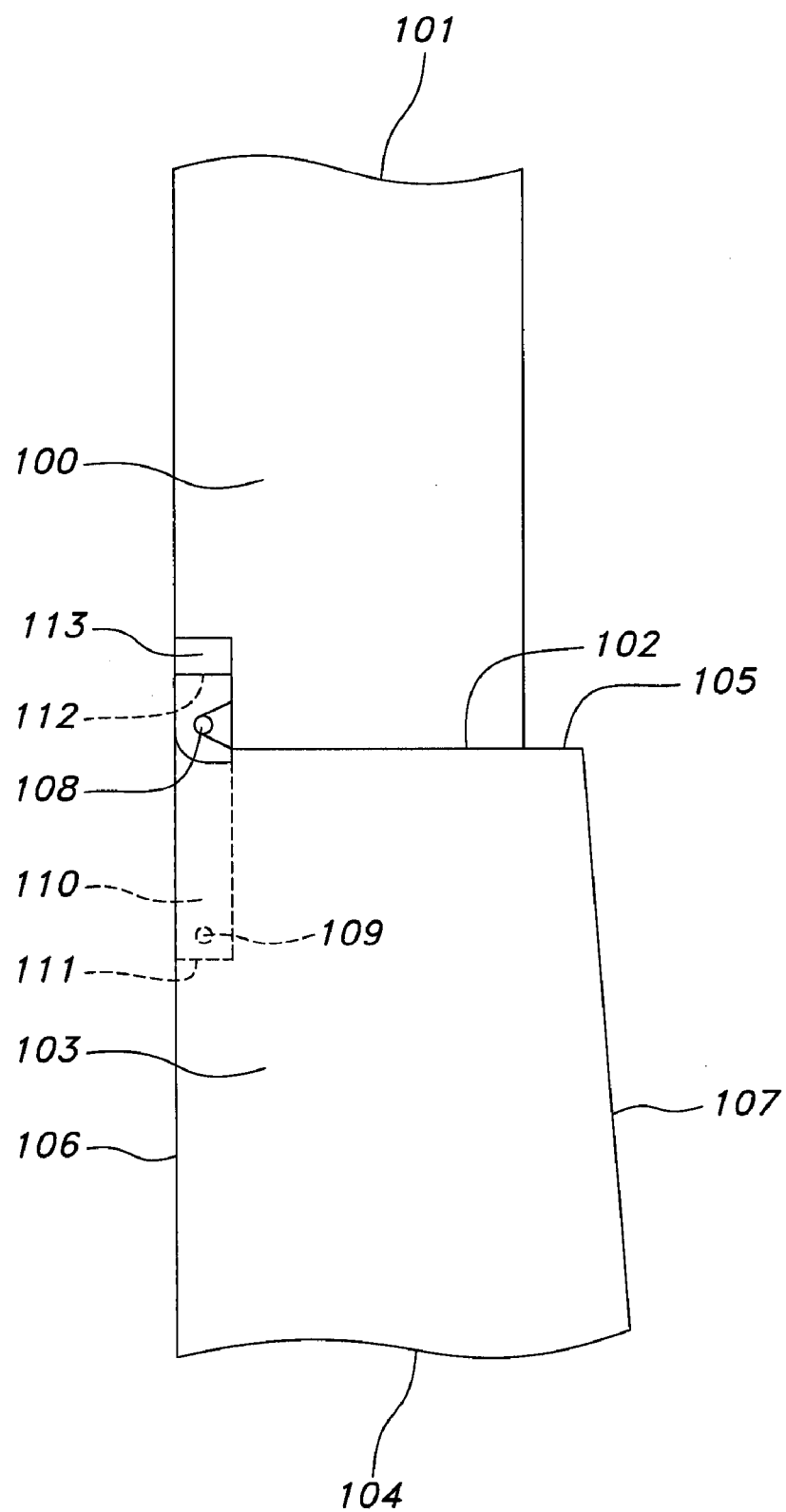
FIG. 4 is an illustration of an exemplary embodiment of the present invention in an extended, fully operational position.

FIGS. 1-4 show exemplary embodiments of the present invention in four positions of use. More specifically, FIG. 1 is an illustration of an exemplary embodiment of the present invention in a folded, non-operational position; FIG. 2 is an illustration of an exemplary embodiment of the present invention in a partially extended position, wherein the boom hinge is nearly halfway to an extended position; FIG. 3 is an illustration of an exemplary embodiment of the present invention in a partially extended position, wherein the boom hinge is almost in a fully extended position; and FIG. 4 is an illustration of an exemplary embodiment of the present invention in an extended, fully operational position.

For context, the tip portion 100, the base portion 103, the link element 110, and the catch element 113 of a boom hinge apparatus are shown in FIGS. 1-4. The tip portion 100 is comprised of a first end 101 and a second end 102. The base portion 103 is comprised of a first end 104, a second end 105, a first side 106, and a second side 107. The first side 106 of the base 103 may include a protrusion that extends past the second 105 end of the base 103. Located on this protrusion is a first pin 108 that is fixed to said protrusion. If the protrusion is not included, the pin may be located near the edge of the second end 105. The link element 110 has a first end 111 and a second end 112. The first end 111 of the link element 110 is rotatably connected to a first point on the base 109 proximate to the first side of the base 106. While FIG. 1 shows the first point 109 attached closer to the second end 105 as opposed to the first end 104 of the base 103, the first point 109 may be at any point proximate to the first side 106 between the first end 104 and the second end 105, so long as the distance between the first point 109 and the first pin 108 is substantially equal to the distance between the first point 109 and a catch element 113, which is coupled to the second end 112 of the link element 110. This catch element 113 is located on the second end 102 of the tip portion 100.

FIG. 1 is an illustration of an exemplary embodiment of the present invention in a folded, non-operational position. In this position, the tip portion 100 is substantially parallel to the base portion 103, and the link element 110 is substantially perpendicular to the first side 106 of the base 103. The purpose of this position is to shorten the length of the boom during transit and to allow clearance for obstructions, such as spray nozzles and plumbing equipment.

FIG. 2 is an illustration of an exemplary embodiment of the present invention in a partially extended position, wherein the boom hinge is nearly halfway to an extended position. From this partially extended position, the tip portion 100 may be rotated into a position in which the second end 102 of the tip portion 100 adjoins the second end 105 of the base portion 103. To facilitate this rotation, the link element 110 rotates around the first point 109 on the base 103 into a position more aligned with the first side 106 of the base 103. This rotation also moves the second end 112 of the link element 110 and the catch element 113 towards the first pin 108.

In an exemplary embodiment of the present invention, the tip portion 100 of the boom is extended using a hydraulic mechanism. Such a mechanism may be attached to the base portion 103 and the tip portion 100 such that the hydraulic mechanism is adapted to rotate the tip portion 100 along the range of motion illustrated in FIGS. 1-4. Those of skill in the art will understand the use of such hydraulic mechanisms and how they may be implemented in accordance with the present invention. Additionally, alternative mechanisms may be employed to extend and retract the tip portion 100 of the boom such as, but not limited to, an electric motor or other suitable mechanism.

FIG. 3 is an illustration of an exemplary embodiment of the present invention in a partially extended position, wherein the boom is almost in a fully extended position. More specifically, FIG. 3 shows the link element 110 aligned with the first side 106 of the base 103. Further, the second end 112 of the link element 110 and the catch element 113 engage the first pin 108 and begin to lock the tip portion 100 into place with respect to the base portion 103.

FIG. 4 is an illustration of an exemplary embodiment of the present invention in an extended, fully operational position. The second end 102 of the tip portion 100 adjoins the second end 105 of the base portion 103 when in the operational position. The tip portion 100 is locked into place with respect to the base portion 103. Such locking occurs when the link element 110 and the catch element 113 engage the first pin on the base 108 and the catch element 113 continues to rotate around the first pin 108 until it is captured on all sides.

Figure 7:
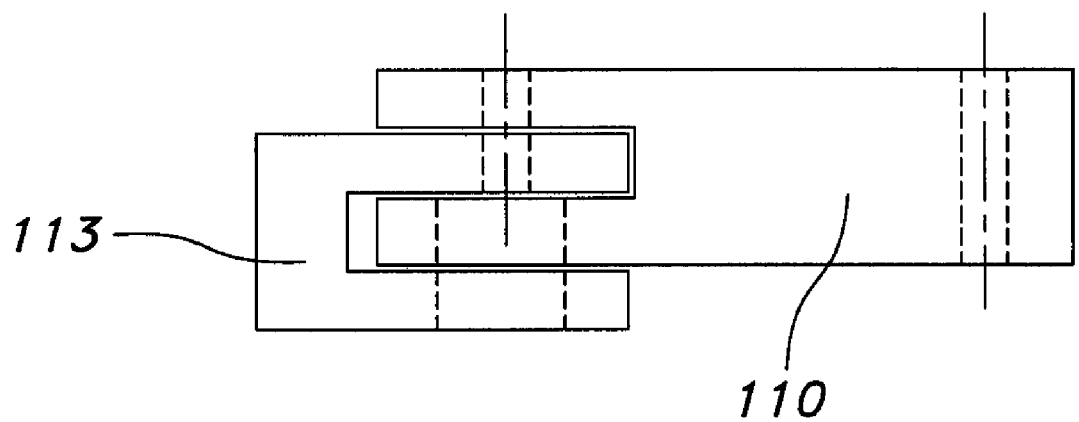
FIG. 7 illustrates the coupling of the link element to the catch element in accordance with an exemplary embodiment of the present invention.

FIGS. 5, 6, and 7 further illustrate the link element 110, the catch element 113, and the coupling of the two. FIGS. 5A-C are illustrations of a u-shaped cutout 500 and pin 501 on the link element 110 in accordance with an exemplary embodiment of the present invention. A u-shaped cutout 500 and a second pin 501 are located proximate to the second end of the link element 112 on opposite sides. The u-shaped cutout 500 and second pin 501 are complementary to the catch element 113, thereby allowing the link element 110 and the catch element 113 to rotate with respect to each other.

FIGS. 6A-C are illustrations of a u-shaped cutout 600 and a circular opening 601 on the catch element 113 in accordance with an exemplary embodiment of the present invention. The catch element 113 is located proximate to the second end of the tip portion 102. Similar to the link element 110, the catch element 113 has a u-shaped cutout 600. Alternatively, those skilled in the art will appreciate that other shapes can be used for said cutout. The link element 110 also has a circular opening 601 opposite the u-shaped cutout 600. The second pin 501 on the link element 110 inserts into the circular opening 601 and u-shaped cutouts on both the catch element 500 and the link element 600 couple together; this coupling is illustrated in FIG. 7. The second pin 501 rotates inside the circular opening 601 enabling the catch element 113 and the link element 110 to rotate with respect to each other.

The catch element 113 and the link element 110 are coupled such that they form a bracket. As the tip portion 100 rotates to adjoin its second end 102 to the second end 105 of the base portion 103, the bracket engages the first pin 108, which is shown in FIG. 3. After this engagement, the catch element 113 continues to rotate around the first pin 108 and captures it on all sides and locks it into place, which in turn locks the tip portion 100 into place with respect to the base portion 103 (i.e., the operational position), as shown in FIG. 4. This motion allows for the transfer of forces from the tip portion 100 to the base portion 103. Moreover, the orientation of the catch element 113 around the first pin 108 keeps the first pin 108 captured for approximately 90 degrees or more of tip rotation with respect to the base, which is more than adequate for the "breakaway" function which forces the present invention into the folded, non-operational position shown in FIG. 1.

In an exemplary embodiment of the present invention, the breakaway function is carried out using hydraulic cylinders that are also used to extend and retract the tip portion 100. In operation, hydraulic pressure may be used to extend the hydraulic cylinder, which in turn extends the tip portion 100 to its extended position. Once in this extended position, a valve may be closed to lock the hydraulic pressure in the hydraulic cylinder and to hold the tip portion 100 in the extended position.

If the tip portion 100 contacts an object or experiences other forces, the tip portion 100 may be pushed out back out of the extended position. As the tip portion 100 is pushed back, the hydraulic cylinder is forced to shorten due to the movement of the tip portion 100 and the pressure in the hydraulic cylinder is increased. This increase in pressure is due to the presence of the valve which prevents the fluid in the hydraulic cylinder from escaping. When the pressure reaches a high enough level, it will force open a relief valve which allows some of the hydraulic fluid to escape the hydraulic cylinder and allows the tip portion 100 to rotate with respect to the base portion 103. When the forces on the tip decrease, the force on the cylinder decreases and thus the hydraulic pressure decreases. When the hydraulic pressure decreases, the relief valve closes and the hydraulic system can increase pressure to extend the tip portion 100 back to its extended position. Those of skill in the art will appreciate that the relief valve may be adjusted to determine the amount of obstruction force necessary to retract the tip portion 100. Alternatively, other breakaway mechanisms may be used, such as springs which hold the tip portion 100 in place during use. Such springs may allow the tip portion 100 to retract when obstacles are encountered.

In an exemplary embodiment of the present invention, the boom hinge is structure such that the tip portion 100 folds rearwardly toward the rear of the vehicle carrying the boom. Alternatively, the tip portion 100 may fold upward or in another suitable direction.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

I claim:

1. A boom hinge apparatus comprising:
a base portion having a first end, a second end, and a first pin located proximate to said second end;
a tip portion having a first end and a second end;
a catch element attached to the second end of the tip portion having a u-shaped cutout and a circular opening; and
a link element having a first end, a second end, and a u-shaped cutout and second pin proximate to said second end, wherein said first end of the link element is rotatably connected to the base,
wherein the u-shaped cutout on the catch element couples with the u-shaped cutout on the link element and the second pin on the link element rotates inside the circular opening on the catch element and engage the first pin when the second end of the tip is rotated into a position adjoining the second end of the base portion.

2. The apparatus of claim 1, wherein the base portion has a first side and a second side, wherein the first side includes a protrusion that extends past the second end.

3. The apparatus of claim 2, wherein the first pin is located on said protrusion.

4. The apparatus of claim 2, wherein the first end of the link element is rotatably connected to the base at a first point located along the first side of the base between the first end and second end of the base.

5. The apparatus of claim 4, wherein the link element has a length equal to a distance between the first pin and the first point.

6. The apparatus of claim 1, wherein the catch element and the u-shaped cutout and second pin on the link element couple together and form a bracket that subsequently engages the first pin and captures the first pin on all sides when the second end of the tip is rotated into a position adjoining the second end of the base portion.

7. The apparatus of claim 1, wherein the catch element and the u-shaped cutout and second pin on the link element couple together and form a bracket that engages the first pin and the catch element subsequently rotates around the first pin to capture the first pin on all sides when the second end of the tip is rotated into a position adjoining the second end of the base portion.

8. The apparatus of claim 1, wherein the catch element and the u-shaped cutout and second pin on the link element disengage the first pin upon contact with a ground obstruction.

9. The apparatus of claim 1, wherein the catch element and the u-shaped cutout and second pin on the link element are coupled together such that they can rotate with respect to each other.

10. The apparatus of claim 1, wherein the orientation of the catch element captures the first pin with 90 degrees or more of tip portion rotation with respect to the base portion.

11. The apparatus of claim 1, wherein the coupling of the catch element and the u-shaped cutout and second pin on the link element engage the first pin when in an operational position.

12. The apparatus of claim 11, wherein the second end of the tip portion adjoins the second end of the base portion when in the operational position.

13. The apparatus of claim 1, wherein the coupling of the catch element and the u-shaped cutout and second pin on the link element disengage the first pin when in a non-operational position.

14. The apparatus of claim 13, wherein the tip portion is parallel to the base portion when in the non-operational position.

15. The apparatus of claim 14, wherein the non-operational position reduces the length of the boom to allow clearance for a ground obstruction.

16. The apparatus of claim 1, wherein the boom hinge apparatus is configured to be hydraulically operated.

17. A boom hinge apparatus comprising:
- a base portion having a first end, a second end, and a first pin located proximate to said second end;
- a tip portion having a first end and a second end;
- a catch element attached to the second end of the tip portion;
- a link element having a first end, a second end, and a u-shaped cutout and second pin proximate to said second end, wherein said first end of the link element is rotatably connected to the base and wherein said u-shaped cutout and second pin couple to the catch element and engage the first pin when the second end of the tip is rotated into a position adjoining the second end of the base portion; and
- wherein the boom hinge apparatus is configured to be hydraulically operated.

* * * * *